United States Patent [19]

Preis

[11] Patent Number: 4,470,943

[45] Date of Patent: Sep. 11, 1984

[54] LOW FRICTION PLASTIC TRACK AND EXTRUSION PROCESS

[75] Inventor: Allen D. Preis, Peninsula, Ohio

[73] Assignee: The Mead Corporation, Dayton, Ohio

[21] Appl. No.: 510,495

[22] Filed: Jul. 5, 1983

Related U.S. Application Data

[60] Continuation of Ser. No. 321,993, Nov. 16, 1981, abandoned, which is a division of Ser. No. 168,951, Jul. 11, 1980, abandoned.

[51] Int. Cl.$^3$ .............................................. B28B 11/18
[52] U.S. Cl. ................................... 264/162; 264/171; 264/179; 264/269; 524/269
[58] Field of Search ................... 264/177 R, 162, 171; 524/269

[56] References Cited

U.S. PATENT DOCUMENTS 3,900,548  8/1975  Wiley ................................. 264/171

OTHER PUBLICATIONS

"Dow Corning Information Bulletin", No. 27-290, 9/74, Dow Corning Corporation, Midland, Michigan.

*Primary Examiner*—Joseph L. Schofer
*Assistant Examiner*—Bernard Lipman
*Attorney, Agent, or Firm*—Harold L. Marquis; Erwin Doerr

[57] ABSTRACT

An elongated plastic track for use in a gravity feed display is extruded from a mixture of high impact polystyrene and dimethylpolysiloxane.

2 Claims, 3 Drawing Figures

LOW FRICTION PLASTIC TRACK AND EXTRUSION PROCESS

This application is a continuation of application Ser. No. 321,993 filed Nov. 16, 1981, now abandoned, which is a division of Ser. No. 168,951 filed July 11, 1980, now abandoned.

TECHNICAL FIELD

This invention relates to a track with a low coefficient of friction which is composed of a mixture of high impact polystyrene and certain organopolysiloxane fluids and the process of extruding such mixture.

BACKGROUND ART

One type of track for the gravity feeding of packages or bottles from the back to the front of a shelf on a display stand is represented by U.S. Pat. No. 2,218,444 issued Oct. 15, 1940, which discloses a metal channel intended primarily for use in conjunction with milk bottles in refrigerators. The metal channel does not lend itself well for economical production procedures.

Another type of gravity feed device includes a downwardly tilted planar support surface over which a plastic feeder belt is arranged to slide as disclosed in U.S. Pat. No. 4,128,177 issued Dec. 5, 1978. As each shelf of a display stand needs several such devices each of which includes a belt, support surface and two rollers, the construction of a display stand utilizing such devices is complicated and involves costly construction.

It has been recognized for a long time that it would be economical to construct a gravity feed track of plastic. However, the coefficient of friction of these plastics was so high that an excessive tilt of the track was required for bottles or packages to slide. Excessive tilt to the track can result in the bottles falling rather than sliding.

Organopolysiloxane release fluids for use as mold release agents have been known for a long time as illustrated by U.S. Pat. No. 2,666,685 issued on Jan. 19, 1954. This mold release composition, which also included other ingredients, was applied to the mold each time an article was molded. To eliminate the labor and time involved in spraying the release agent on the mold each time, it is now common to incorporate a small amount of certain mold release agents, such as a dimethylpolysiloxane fluid, in the plastic resin being molded. The dimethylpolysiloxane fluid not only aids in the release of the resin from the mold but also sometimes aids in the processability of the resin. Dimethylpolysiloxane fluid is normally added to resins in an amount from approximately 0.1 to 0.25 percent by weight of the resin. The addition of dimethylpolysiloxane fluid to various resins is disclosed in Dow Corning Bulletin 22-290 dated 9/74. Tracks formed of a combination of high impact polystyrene and silicone are disclosed in U.S. patent application No. 098,876 entitled "Gravity Feed Shelf" filed Nov. 30, 1979, now U.S. Pat. No. 4,314,648.

DISCLOSURE OF THE INVENTION

A plastic track with an exceptionally low coefficient of friction is formed by extruding a mixture of from 95.0 to 99.5 percent by weight of high impact polystyrene and from 0.5 to 5.0 percent by weight of an organopolysiloxane fluid having silicon bonded hydrocarbon radicals selected from a group consisting of methyl, ethyl and phenyl radicals and which have from 1.9 to 3.0 hydrocarbon radicals per silicon radical. Suitable organopolysiloxane fluids include dimethylsiloxane, diethylsiloxane, phenylmethylsiloxane and copolymers thereof. These siloxane fluids may have any viscosity but preferably from 1000 to 60,000 centistokes. Preferably the mixture includes from 1.5 to 3.0 percent by weight organopolysiloxane fluid.

The tracks are formed by extruding a mixture of high impact polystyrene and the desired organopolysiloxane. High impact polystyrene is normally extruded at a temperature of approximately 335° F. at the gate of the extruder and 360° F. at the die. It has been discovered that the coefficient of friction of the track can be significantly decreased if the gate temperature is increased to approximately 365° F. to 400° F. and the die temperature to 425° F. to 475° F. In addition, the temperatures in the various feeding zones of the extrusion were reduced by approximately 20° to 25° below the temperature normally employed in extruding high impact polystyrene. Optimal temperatures are approximately 385° F. at the gate and 450° F. at the die. It is thought that the higher extrusion temperatures at the gate and die result in a lower coefficient of friction because a greater amount of organopolysiloxane is on or near the surface of the track. It is also thought that the higher gate and die temperatures allow the molten resin to better fill out the radii in the die itself which leads to a more uniform surface resulting in a lower coefficient of friction. The coefficient of friction of the surface of the track can be lowered even more by burnishing the surface shortly after it has been extruded and is still warm. This results in removal of the portion of the skin of the track which is thought to have a lower concentration of organopolysiloxane than the internal matrix of the track.

DESCRIPTION OF DRAWINGS

While the coefficient of friction is reduced regardless of the configuration of the track, the coefficient of friction can be reduced even more by constructing a track of a particular configuration. The track shown in the drawings has an especially low coefficient of friction.

The chute type of track C is especially adapted for use in conjunction with the display of various types of bottles. The chute C is placed on a shelf such as illustrated in U.S. patent application No. 098,876 filed Nov. 30, 1979. The bottles are placed on the chute C which tilts towards the front part of the shelf as shown in FIG. 1 of said application.

Figure 1:
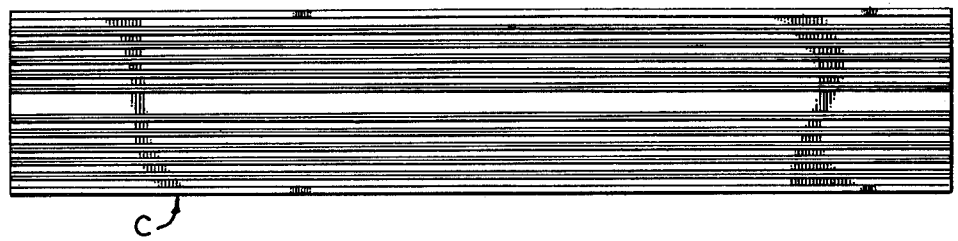
FIG. 1 is a top plan view of an extruded channel shaped chute type of track formed of a mixture of high impact polystyrene and dimethylpolysiloxane.

The angle of the tilt of the shelf 12 shown in FIG. 1 of said application from horizontal may vary somewhat but is preferably between 3½° minimum tilt to a maximum tilt of approximately 8°. The angle of tilt for most applications should be approximately 6° from horizontal.

Figure 2:
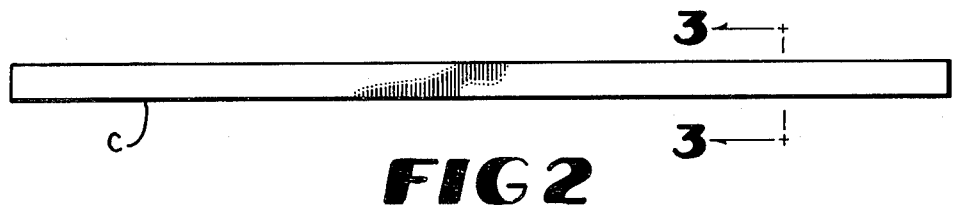
FIG. 2 is a side view of the chute type of track shown in FIG. 1.
Figure 3:
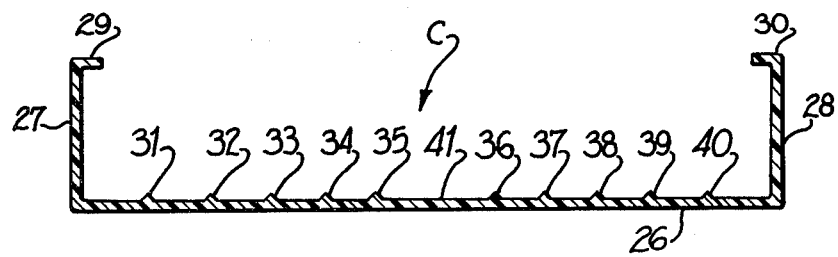
FIG. 3 is a cross-sectional view taken along the line designated 3—3 in FIG. 2.

As is apparent from FIGS. 1, 2 and 3, a chute C includes a central web panel 26 and a pair of side flange panels 27 and 28 which are integrally formed with the web panel 26. Inwardly projecting guide strips 29 and 30 are formed integrally with flange panels 27 and 28 as is apparent in FIG. 3.

For the purpose of minimizing friction between the bottoms of the bottles and the upper surface of web panel 26, a plurality of upwardly projecting ribs 31-40 are provided and are of generally triangular cross-sectional configuration.

As a means of disposing of undesired moisture and debris accumulation a central trough designated by the numeral 41 is formed in the upper surface web panel 26 and is disposed between the ribs 35 and 36. This trough can serve as a retention cavity for suitable retractable spring means (not shown) which, if desired, could be employed to afford an additional force urging a row of bottles forwardly and downwardly.

BEST MODE OF CARRYING OUT

The preferred organopolysiloxane is dimethylsiloxane with a viscosity of from 20,000 to 40,000 centistokes. Dimethylsiloxane is generally incompatible with high impact polystyrene. Consequently, special steps must be taken in order to insure that the dimethylsiloxane is well dispersed throughout the polystyrene prior to extrusion. The preferred method of extrusion is to mix one-half of the high impact polystyrene with the entire amount of dimethylsiloxane to be used in an extruder and extrude pellets of the mixture. These pellets can then be mixed with the remaining polystyrene pellets in an extruder and extruded into the desired track. In order to achieve a low coefficient of friction it is necessary that the temperatures in the feed zone of the extruder be 20° F.–25° F. lower than the temperatures normally employed in extruding such polystyrene. More importantly, the temperatures at the gate must be approximately 50° F. higher than normal temperatures at the gate and approximately 90° F. higher than normal at the die. It has been found that the preferred temperature at the gate is approximately 380° F. and 450° F. at the die. The amount of pressure employed is approximately 1100 psi.

Immediately after extrusion, the sliding surface of the track may be burnished to remove a portion of the skin. This can be accomplished by rubbing oak wood lightly over the sliding surface of the track. The track formed by this process is a combination of organopolysiloxane and polystyrene of an exceptionally low coefficient of friction. These tracks are especially useful in gravity feed systems to be used on display stands in retail stores.

EXAMPLE

A comparison is made of the coefficient of friction of various tracks extruded from high impact polystyrene and a combination of high impact polystyrene and dimethylpolysiloxane. The dimethyl polysiloxane was a fluid of approximately 30,000 centistokes, produced by Dow Corning and is referred to as Dow Corning ®200 Fluid. Several different methods of mixing the dimethylpolysiloxane and the high impact polystyrene were compared. In Mixing Technique A, the dimethylpolysiloxane was added directly to the extruder along with the high impact polystyrene. In Mixing Technique B, the dimethylpolysiloxane was added to the high impact polystyrene pellets and mixed in an extruder, extruded into pellets and then extruded again into the desired shape. Best results have been achieved with Mixing Technique C whereby one-half of the high impact polystyrene pellets were mixed with all of the dimethylpolysiloxane and pellets extruded. These pellets were then mixed with the remaining pellets of pure high impact polystyrene and extruded into track form. The results of these tests are set forth in Table 1. Table 2 sets forth the temperatures at which high impact polystyrene is commonly extruded and also the temperatures at which high impact polystyrene containing a dimethylpolysiloxane additive, the composition used in the present invention, is extruded.

The friction properties of the various tracks were determined by the time required for a 2 liter polyethylene terephthalate bottle filled with water to travel 20 inches on the track which was maintained at a 5½° angle. The times were based on an average of 5 trials recorded on a chronograph watch. The sliding surfaces of the tracks were lightly burnished with oak wood immediately after extrusion while the plastic was still warm.

TABLE 1
COMPARISON OF THE FRICTION OF TRACKS OF VARIOUS COMPOSITIONS

| Track No. | % Dimethyl-siloxane in Final Mixture | Mixing Technique | Surface Appearance | Extrudate Consistency | Time (Sec) | Velocity (ft/min) |
|---|---|---|---|---|---|---|
| 1 | 0 | — | — | — | won't slide | 0 |
| 2 | 1.00 | A | — | — | 1.79 | 55.8 |
| 3 | 2.00 | A | — | — | 1.56 | 64.1 |
| 4 | 2.00 | B | Fair | Very poor | 1.49 | 67.1 |
| 5 | 2.00 | C | Excellent | Excellent | 1.74 | 57.5 |

TABLE 2
EXTRUDER CONDITIONS

| Extruder Temperatures (°F.) | Pure High Impact Polystyrene | High Impact Polystyrene with Dimethylsiloxane Additive |
|---|---|---|
| Zone 1 | 300 | 280 |
| 2 | 335 | 310 |
| 3 | 365 | 325 |
| 4 | 385 | 360 |
| 5 | 410 | 385 |
| Gate | 335 | 385 |
| Die | 360 | 450 |
| Melt Temp. (°F.) | 375 | 357 |
| Melt Pressure (PSI) | 1100 | 1100 |

I claim:

1. A process for making an elongated plastic track for use in a gravity feed display device, said track having a low coefficient of friction on at least one of its surfaces, comprising the steps of
    (a) mixing from 95.0 to 99.5 percent by weight of high impact polystyrene with 0.5 to 5.0 percent by weight of dimethylpolysiloxane fluid having a viscosity of between 20,000 and 40,000 centistokes so that the dimethylpolysiloxane is well dispersed in said high impact polystyrene,
    (b) extruding the mixture formed in (a) so as to form a track of the desired shape, and
    (c) thereafter burnishing said one surface of said track to decrease the coefficient of friction on said one surface.

2. An elongated plastic track for use in a gravity feed display device produced in accordance with claim 1.

* * * * *